United States Patent Office 2,820,798

Patented Jan. 21, 1958

2,820,798
COPOLYMERS OF ORGANIC SILICON COMPOUNDS AND N-VINYL PYRROLIDONE

Donald L. Bailey, Snyder, and Ronald M. Pike, Grand Island, N. Y., assignors to Union Carbide Corporation, a corporation of New York No Drawing. Application March 27, 1956
Serial No. 574,105

17 Claims. (Cl. 260—326.5)

This invention relates to polysiloxanes. More particularly, this invention is directed to copolymers of mono-vinyl siloxanes and N-vinyl pyrrolidone as new compositions of matter and to a process for producing the same.

Copolymers of unsaturated organic compounds and a number of unsaturated silicon-containing compounds have been suggested. For the most part those suggestions involve the copolymerization of an unsaturated organic compound with either a simple olefinic silane or a polysiloxane containing a plurality of unsaturated groups. Copolymers of the above type are characterized by their stability against decomposition at elevated temperatures and thus have advantages over those polymers or copolymers derived from purely organic materials. However, such copolymers have not met with wide acceptance as they are not suitable for a wide variety of applications. By way of illustration, difficulty is encountered in obtaining a silicone copolymer that is water soluble so that it can be used as an emulsifying agent with silicone oil-water emulsions.

The present invention is based on our discovery that thermally stable silicon-containing copolymers, which are soluble in water and various liquid organic compounds, can be produced by copolymerizing a mono-vinyl silicon-containing compound with an olefinic pyrrolidone. More specifically, we have found that useful copolymers can be produced by copolymerizing a mono-vinyl methylsiloxane with N-vinyl pyrrolidone.

The copolymers of our invention can be produced by forming a mixture of a mono-vinyl methylsiloxane and N-vinyl pyrrolidone and heating the mixture in the presence of a catalyst to a temperature sufficiently elevated to cause the starting materials to react to produce the copolymer.

The mono-vinyl methylsiloxanes which we prefer to employ as one of the starting materials in our process can be graphically represented by the formula:

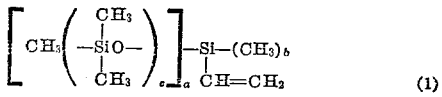

$$\left[CH_3\left(-\overset{\displaystyle CH_3}{\underset{\displaystyle CH_3}{\overset{|}{\underset{|}{Si}}}}O-\right)_c\right]_a-\underset{\displaystyle CH=CH_2}{\underset{|}{Si}}-(CH_3)_b \qquad (1)$$

wherein $a$, $b$ and $c$ are integers with $a$ having a value of from 1 to 3, $b$ having a value of from 0 to 2, $c$ having a value of from 1 to 6, with the sum of $a$ and $b$ being equal to 3, the product of $a$ and $c$ having a value of from 1 to 6, and there are up to 7 silicon atoms in the molecule. Illustrative of these mono-vinyl siloxanes we can employ are: tris(trimethylsiloxy)vinylsilane, bis(trimethylsiloxy)-methylvinylsilane, trimethylsiloxydimethylvinylsilane and the like.

Our preferred mono-vinyl methylsiloxane starting materials can be produced by heating a mixture of a methylsiloxy substituted silane which contains only one hydrogen atom bonded directly to silicon, acetylene and a catalyst to a temperature sufficiently elevated to cause the starting materials to react to produce a mono-vinyl methylsiloxane. By way of illustration, bis(trimethylsiloxy)-methylvinylsilane is produced by heating bis(trimethylsiloxy)methylsilane with acetylene in the presence of platinum as catalyst to a temperature sufficiently elevated to cause the acetylene and substituted silane to react. Processes for producing mono-vinyl methylsiloxanes useful as starting materials in the present invention are described and claimed in copending United States patent applications Serial Nos. 544,033, 544,087 and 574,104.

Our preferred mono-vinyl methylsiloxane starting materials are linear compounds such as correspond to graphical Formula 1 above. However mono-vinyl cyclic methylsiloxanes are also useful in producing our copolymers. Thus we may copolymerize N-vinyl pyrrolidone with such mono-vinyl cyclic methylsiloxanes as vinyl pentamethylcyclotrisiloxane, vinylheptamethylcyclotetrasiloxane, vinylnonamethylcyclopentasiloxane and the like according to the process of our invention to produce our copolymers.

The polymerization temperatures which we can employ in our process are not narrowly critical and can vary over a wide range. We can employ temperatures as low as 30° C. and as high as 150° C. and above; however, we prefer to employ a temperature of from about 80° C. to about 130° C. Temperatures above and below the suggested ranges can also be employed; however, no commensurate advantage is obtained thereby.

As catalysts for our process, we can employ any of the compounds employed in vinyl-type polymerization reactions By way of illustration we can employ organic peroxides such as the alkyl and aryl peroxides including tertiary butyl peroxide and benzoyl peroxide and the like, organic azo compounds such as alpha, alpha'-azodiisobutyronitrile and the like and ultra violet light.

The amount of catalyst employed in our process is not narrowly critical. We can employ the catalyst in amounts of from as little as about 0.02 percent up to about 2.5 percent by weight of the starting materials. However, we prefer to employ the catalyst in an amount of from about 0.5 to about 1.5 percent by weight of the starting materials. Amounts of the catalyst outside of the wider range disclosed above can also be employed; however, no commensurate advantage is obtained thereby.

One way of carrying out the copolymerization of the mono-vinyl methylsiloxane and N-vinyl pyrrolidone is to charge these starting compounds together with a catalyst into a closed vessel and to heat the resulting mixture to a temperature at which they will react to produce the copolymer. If desired, the reaction can be conducted in an inert atmosphere to minimize undesirable side reactions and/or inhibition of the reaction due to atmospheric oxygen. Protection of the reactants can be accomplished by adding the starting materials and catalyst to a closed vessel and charging an inert gas such as argon, nitrogen or the like thereto.

To obtain good reactive contact between the molecules of the starting materials we can carry out our process by first dissolving the mono-vinyl methylsiloxane and the N-vinyl pyrrolidone in suitable liquid organic compounds, preferably one in which the reactants are completely soluble, adding the catalyst to the solution and heating the mixture to a temperature at which reaction occurs. Illustrative of the liquid organic compounds in which the starting materials of our process are completely soluble are the aromatic hydrocarbons such as toluene, xylene and the like. The amount of the liquid organic compound employed is not narrowly critical. In our work we have found that an amount of the liquid organic compound equal in weight to the combined weight of the reactants can be employed with good results. Our process can be also carried out by adding the starting materials to a liquid organic compound or aqueous admixture in which they are not soluble, but in which they can be finely dispersed as in the form of an emulsion, adding the catalyst and heating the mixture to the reaction temperature.

The mono-vinyl methylsiloxane and N-vinyl pyrrolidone starting materials can be employed in our process in varying amounts depending upon the desired content of combined mono-vinyl methylsiloxane or combined N-vinyl pyrrolidone in the copolymer. Thus, amounts of the mono-vinyl methylsiloxane of from as little as about 1 percent to as high as about 99 percent by weight and amounts of N-vinyl pyrrolidone of from about 99 percent to about 1 percent by weight of the total weight of the reactants can be employed. We prefer to employ the mono-vinyl methylsiloxane in an amount of from about 5 percent to about 50 percent by weight and N-vinyl pyrrolidone in an amount of from about 95 percent to about 50 percent by weight of the total weight of the reactants.

We have found that the higher the initial concentration of the starting mono-vinyl methylsiloxane in the reaction mixture up to a maximum of about 35 percent by weight of the total weight of the reactants, the faster the rate at which the copolymerization proceeds. On the other hand, with initial concentrations of the starting mono-vinyl siloxane in the reaction mixture above about 35 percent by weight of the total weight of the reactants the rate of the copolymerization reaction decreases. According to our experience with other systems wherein an unsaturated organic compound and an unsaturated organic silicon-containing compound are copolymerized the rate at which copolymerization proceeds decreases as the concentration of the unsaturated organic silicon-containing compound in the initial reaction mixture increases. Apparently, the reactants in our process are characterized by properties which have an unusual effect on the rate at which our copolymerization reaction proceeds, such properties appearing to have their most beneficial effect on the rate of reaction when employed in amounts of from about 1 to about 50 percent by weight of the total weight of the reactants of the mono-vinyl methylsiloxane and from about 99 percent to about 50 percent by weight of the total weight of the reactants of N-vinyl pyrrolidone.

Starting with given amounts of the reactants, the composition of the copolymer resulting from our process can be approximately determined by the equation below developed by T. Alfrey, Jr., J. Bohrer and H. Mark appearing in the text "High Polymers," volume VIII, "Copolymerization," published by Interscience Publishers, Inc., New York, New York, 1952, which relates monomer and polymer compositions with the reactivities of the monomers involved.

$$\frac{m_1}{m_2} = \frac{M_1}{M_2} \frac{r_1 M_1 + M_2}{r_2 M_2 + M_1}$$

where:

$M_1$ and $M_2$ are mole fractions of monomers in the monomer mixture.

$m_1$ and $m_2$ are mole fractions of monomer in the copolymer.

$r_1$ and $r_2$ are reactivity ratios which relate the relative rates of the propagation reactions involved.

The reactivity ratios $r_1$ and $r_2$ can be further defined by:

$$r_1 = \frac{k_{11}}{k_{12}}$$

and $$r_2 = \frac{k_{22}}{k_{21}}$$

where:

$k_{11}$ and $k_{12}$ are rate constants for reaction of $M_1$ with growing polymer radicals terminated with $m_1$ and $m_2$, respectively.

$k_{21}$ and $k_{22}$ are rate constants for reaction of $M_2$ with growing polymer radicals terminated with $m_1$ and $m_2$, respectively.

In our system N-vinyl pyrrolidone is relatively more reactive than the starting mono-vinyl siloxane, the former compound having a reactivity ratio of about 4 as compared with a reactivity ratio of about 0.1 for the mono-vinyl methylsiloxane. Equal amounts by weight of N-vinyl pyrrolidone and a mono-vinyl methylsiloxane copolymerized in accordance with our process yield a copolymer which contains a smaller amount of the combined mono-vinyl methylsiloxane than of the combined N-vinyl pyrrolidone. The relative amount of the combined mono-vinyl siloxane in the copolymer can be increased by increasing the concentration of the mono-vinyl siloxane in the reaction mixture and in this manner the lower reactivity of the mono-vinyl siloxane can be compensated for. For example, in the above illustration where equal amounts by weight of our starting materials are copolymerized the combined mono-vinyl methylsiloxane content of the copolymer could be increased by increasing the concentration of the mono-vinyl methylsiloxane in the initial reaction mixture. However, as indicated above, an increased initial concentration of the mono-vinyl siloxane compound over and above about 35 percent by weight of the reactants decreases the rate of the reaction.

One method of increasing the siloxane content of the copolymers of our invention, other than by employing large amounts of the mono-vinyl methylsiloxanes in the initial reaction mixture, includes the steps of producing a copolymer from our starting materials under the conditions which insure a rapid rate of reaction and subsequently equilibrating the copolymer with a methylpolysiloxane. Such equilibration reactions can be caused to take place between or among compounds containing silicon to oxygen to silicon linkages and are carried out by heating the compounds, in the presence of an acidic or basic catalyst, to a temperature at which the reaction will occur. There results or is produced by such equilibration reactions a copolymer having a structure similar to that of the initial copolymer with the exception that the pendant siloxane groups have additional methylsiloxy units.

Illustrative of the methylpolysiloxanes which can be equilibrated with the copolymers of our invention to increase the siloxane content thereof are such compounds having more than two consecutive silicon to oxygen to silicon bonds as hexamethylcyclotrisiloxane, octamethylcyclotetrasiloxane, octamethyltrisiloxane, dimethylpolysiloxanes and the like.

As catalysts for the equilibration reaction we can employ both acidic and basic catalysts. Illustrative of suitable basic catalysts are sodium hydroxide, potassium hydroxide, potassium dimethylsilanolate and the like, while sulfuric acid is typical of the suitable acidic catalysts.

In carrying out the equilibration reaction, the starting mono-vinyl methylsiloxane-N-vinyl pyrrolidone copolymer and methylpolysiloxane are preferably added to a suitable liquid organic compound in which they are completely soluble. Suitable liquid organic compounds in which the starting materials are completely soluble are the aromatic hydrocarbons such as toluene, xylene and the like.

The copolymers of our invention can be regarded as molecules having long carbon chains with pendant hydrogen atoms, pyrrolidone groups and methylsiloxane groups. Such copolymers can have a structure of alternating combined mono-vinyl methylsiloxane-N-vinyl pyrrolidone units, which, when the mono-vinyl methylsiloxane is tris(trimethylsiloxy)vinylsilane can be graphically represented by the unit:

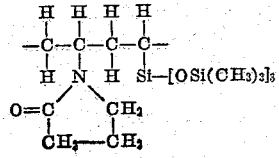

or the copolymers can comprise constituent molecules having alternating blocks of two or more combined N-vinyl pyrrolidone units linked to blocks of two or more combined tris(trimethylsiloxy)vinylsilane units as graphically represented by the formula:

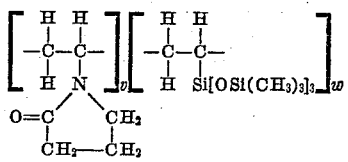

or they can comprise molecules having a structure including both types of units disclosed above which can be graphically represented by the formula:

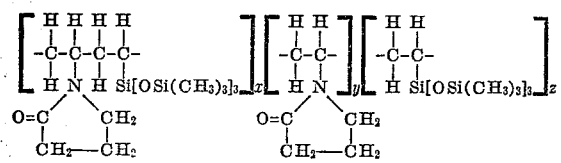

where $v$, $w$, $x$, $y$ and $z$ are integers.

Our preferred copolymers contain from about 1 percent to about 50 percent by weight of combined mono-vinyl siloxane. Such copolymers are particularly useful in view of their water solubility which makes them especially valuable as emulsifying agents in dimethylpolysiloxane oil-water systems. Our copolymers are also soluble in aliphatic ketones such as acetone. In addition the copolymers of our invention can also be employed as additives for lubricants, detergents and mold release compounds.

The following examples are illustrative of our invention:

Example I

To a test tube which had been previously flushed with argon were added 3.0 grams of tris(trimethylsiloxy)-vinylsilane, 7.0 grams of 99.5 percent uninhibited N-vinyl pyrrolidone, 0.1 gram of a 30 percent hydrogen peroxide solution and 10 cc. of xylene. The test tube was again flushed with argon, sealed and immersed in an oil bath that was maintained at a temperature of 125° C. for a period of 0.28 hour. After heating, the contents of the tube, which had increased in viscosity during heating, were poured into 500 cc. of diethyl ether and the tris(trimethylsiloxy)vinylsilane-N-vinyl pyrrolidone copolymer precipitated therefrom. The precipitate was dissolved in 50 cc. of acetone and then reprecipitated by adding 250 cc. of diethyl ether. The reprecipitated material was dried in an air oven maintained at a temperature of 65° C. for a period of 18 hours. The dried tris-(trimethylsiloxy)vinylsilane - N - vinyl pyrrolidone copolymer was analyzed and found to contain 3.1 percent by weight thereof of silicon which value corresponds to a combined tris(trimethylsiloxy)vinylsilane content of 10.16 percent by weight. This analysis together with the rate of copolymerization curves obtained and the reactivity ratios calculated proved that copolymerization had occurred.

Example II

Following the procedure disclosed in Example I, mixtures of tris(trimethylsiloxy)vinylsilane and N-vinyl pyrrolidone, in which the silane compound was present in amounts of 10 percent, 20 percent and 50 percent by weight of the reactants, were copolymerized. The copolymers obtained from each reaction were analyzed to determine the content of combined tris(trimethylsiloxy)-vinylsilane therein. The data obtained appears in the table below:

| Run | Percent by weight of tris(trimethylsiloxy)vinylsilane in reaction mixture | Percent by weight of combined tris-(trimethylsiloxy)vinylsilane in copolymer |
|---|---|---|
| 1 | 10 | 4.88 |
| 2 | 20 | 8.05 |
| 3 | 50 | 18.64 |

When heated these copolymers softened at a temperature of from about 170° C. to about 180° C. and melted in the range from 200° C. to 205° C. In addition, these copolymers were found to be completely soluble in acetone and water.

Example III

A solution containing 90 percent by weight of a dimethylpolysiloxane oil and 10 percent by weight of one of our copolymers was prepared. The oil had a viscosity of 350 centistokes and the copolymer contained 10 percent by weight of combined mono-vinyl methylsiloxane. Water was slowly added to this solution until inversion occurred. An oil in water emulsion was thereby obtained.

What is claimed is:

1. A copolymer of N-vinyl pyrrolidone and trimethylsiloxydimethylvinylsilane.
2. A copolymer of N-vinyl pyrrolidone and bis(trimethylsiloxy)methylvinylsilane.
3. A copolymer of N-vinyl pyrrolidone and tris(trimethylsiloxy)vinylsilane.
4. A copolymer of N-vinyl pyrrolidone and a mono-vinyl siloxane, said siloxane having the graphical formula:

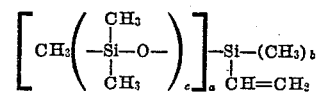

wherein:

(1) $a$, $b$ and $c$ are integers,
(2) $a$ has a value from 1 to 3,
(3) $b$ has a value from 0 to 2,
(4) $c$ has a value from 1 to 6,
(5) the sum of $a$ and $b$ is 3,
(6) the product of $a$ and $c$ is from 1 to 6 and
(7) there are up to 7 silicon atoms in the molecule.

5. A process for producing a copolymer of N-vinyl pyrrolidone and a mono-vinyl siloxane, said siloxane having the graphical formula:

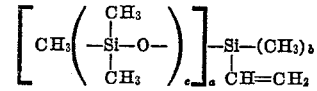

wherein $a$, $b$ and $c$ are integers, $a$ has a value from 1 to 3, $b$ has a value from 0 to 2, $c$ has a value from 1 to 6, the sum of $a$ and $b$ is 3, the product of $a$ and $c$ is from 1 to 6 and there are up to 7 silicon atoms in the molecule; which comprises forming a mixture of said siloxane, N-vinyl pyrrolidone and a vinyl-type polymerization catalyst and heating the mixture to a temperature sufficiently elevated to cause the siloxane and N-vinyl pyrrolidone to react to produce the copolymer.

6. A process for producing a copolymer of N-vinyl pyrrolidone and a mono-vinyl siloxane, said siloxane having the graphical formula:

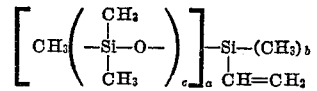

wherein $a$, $b$ and $c$ are integers, $a$ has a value from 1 to 3, $b$ has a value from 0 to 2, $c$ has a value from 1 to 6, the sum of $a$ and $b$ is 3, the product of $a$ and $c$ is from 1 to 6 and there are up to 7 silicon atoms in the molecule; which comprises forming a mixture of said siloxane, N-vinyl pyrrolidone and a vinyl-type polymerization catalyst, said mixture containing from about 5% to about 50% by weight of the total weight of said siloxane and N-vinyl pyrrolidone of said siloxane, and heating the mixture to a temperature sufficiently elevated to cause the siloxane and N-vinyl pyrrolidone to react to produce the copolymer.

7. A process for producing a copolymer of N-vinyl pyrrolidone and trimethylsiloxydimethylvinylsilane which comprises forming a mixture of said silane, N-vinyl pyrrolidone and a vinyl-type polymerization catalyst and heating the mixture to a temperature sufficiently elevated to cause the silane and N-vinyl pyrrolidone to react to produce the copolymer.

8. A process for producing a copolymer of N-vinyl pyrrolidone and trimethylsiloxydimethylvinylsilane which comprises forming a mixture of said silane, N-vinyl pyrrolidone and a vinyl-type polymerization catalyst, said mixture containing from about 5% to about 50% by weight of the total weight of said silane and N-vinyl pyrrolidone of said silane, and heating the mixture to a temperature sufficiently elevated to cause the silane and N-vinyl pyrrolidone to react to produce the copolymer.

9. A process for producing a copolymer of N-vinyl pyrrolidone and bis(trimethylsiloxy)methylvinylsilane which comprises forming a mixture of said silane, N-vinyl pyrrolidone and a vinyl-type polymerization catalyst, and heating the mixture to a temperature sufficiently elevated to cause the silane and N-vinyl pyrrolidone to react to produce the copolymer.

10. A process for producing a copolymer of N-vinyl pyrrolidone and bis(trimethylsiloxy)methylvinylsilane which comprises forming a mixture of said silane, N-vinyl pyrrolidone and a vinyl-type polymerization catalyst, said mixture containing from about 5% to about 50% by weight of the total weight of said silane and N-vinyl pyrrolidone of said silane, and heating the mixture to a temperature sufficiently elevated to cause the silane and N-vinyl pyrrolidone to react to produce the copolymer.

11. A process for producing a copolymer of N-vinyl pyrrolidone and tris(trimethylsiloxy)vinylsilane which comprises forming a mixture of said silane, N-vinyl pyrrolidone and a vinyl-type polymerization catalyst and heating the mixture to a temperature sufficiently elevated to cause the silane and N-vinyl pyrrolidone to react to produce the copolymer.

12. A process for producing a copolymer of N-vinyl pyrrolidone and tris(trimethylsiloxy)vinylsilane which comprises forming a mixture of said silane, N-vinyl pyrrolidone and a vinyl-type polymerization catalyst, said mixture containing from about 5% to about 50% by weight of the total weight of said silane and N-vinyl pyrrolidone of said silane, and heating the mixture to a temperature sufficiently elevated to cause the silane and N-vinyl pyrrolidone to react to produce the copolymer.

13. A process for producing an equilibrated copolymer of N-vinyl pyrrolidone and a mono-vinyl siloxane, said siloxane having the graphical formula:

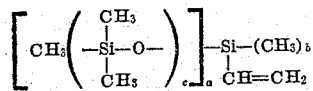

wherein $a$, $b$ and $c$ are integers, $a$ has a value from 1 to 3, $b$ has a value from 0 to 2, $c$ has a value from 1 to 6, the sum of $a$ and $b$ is 3, the product of $a$ and $c$ is from 1 to 6 and there are up to 7 silicon atoms in the molecule; which comprises forming a mixture of said siloxane, N-vinyl pyrrolidone and a vinyl-type polymerization catalyst and heating the mixture to a temperature sufficiently elevated to cause the siloxane and N-vinyl pyrrolidone to react to produce a copolymer; and increasing the siloxane content of said copolymer by equilibrating said copolymer with an organopolysiloxane containing more than two consecutive silicon to oxygen to silicon bonds, said equilibration being conducted by heating the copolymer and the organopolysiloxane in the presence of an equilibration catalyst selected from the group consisting of acidic and basic catalysts to a temperature sufficiently elevated to cause the copolymer and the organopolysiloxane to react to produce an equilibrated copolymer having a greater siloxane content than the unequilibrated copolymer initially produced.

14. A process for producing an equilibrated copolymer of N-vinyl pyrrolidone and a mono-vinyl siloxane, said siloxane having the graphical formula:

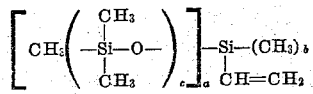

wherein $a$, $b$ and $c$ are integers, $a$ has a value from 1 to 3, $b$ has a value from 0 to 2, $c$ has a value from 1 to 6, the sum of $a$ and $b$ is 3, the product of $a$ and $c$ is from 1 to 6 and there are up to 7 silicon atoms in the molecule; which comprises forming a mixture of said siloxane, N-vinyl pyrrolidone and a vinyl-type polymerization catalyst, said mixture containing from about 5% to about 50% by weight of the total weight of said siloxane and N-vinyl pyrrolidone of said siloxane, and heating the mixture to a temperature sufficiently elevated to cause the siloxane and N-vinyl pyrrolidone to react to produce a copolymer; and increasing the siloxane content of said copolymer by equilibrating said copolymer with an organopolysiloxane containing more than two consecutive silicon to oxygen to silicon bonds, said equilibration being conducted by heating the copolymer and the organopolysiloxane in the presence of an equilibration catalyst selected from the group consisting of acidic and basic catalysts to a temperature sufficiently elevated to cause the copolymer and the organopolysiloxane to react to produce an equilibrated copolymer having a greater siloxane content than the unequilibrated copolymer initially produced.

15. A process for producing a copolymer of N-vinyl pyrrolidone and a mono-vinyl siloxane, said siloxane having the graphical formula:

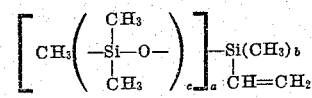

wherein $a$, $b$ and $c$ are integers, $a$ has a value from 1 to 3, $b$ has a value from 0 to 2, $c$ has a value from 1 to 6, the sum of $a$ and $b$ is 3, the product of $a$ and $c$ is from 1 to 6 and there are up to 7 silicon atoms in the molecule; which comprises forming a mixture of said siloxane, N-vinyl pyrrolidone and a vinyl-type polymerization catalyst, said mixture containing from about 1% to about 99% by weight of the total weight of said siloxane and N-vinyl pyrrolidone of said siloxane, and heating the mixture to a temperature sufficiently elevated to cause the siloxane and N-vinyl pyrrolidone to react to produce a copolymeric product.

16. A process for producing a copolymer of N-vinyl pyrrolidone and a mono-vinyl siloxane, said siloxane having the graphical formula:

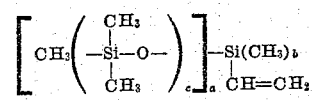

wherein $a$, $b$ and $c$ are integers, $a$ has a value from 1 to 3, $b$ has a value from 0 to 2, $c$ has a value from 1 to 6, the sum of $a$ and $b$ is 3, the product of $a$ and $c$ is from 1 to 6 and there are up to 7 silicon atoms in the molecule; which comprises forming a mixture of said siloxane, N-vinyl pyrrolidone and a vinyl-type polymerization catalyst, said mixture containing from about 1% to about 99% by weight of the total weight of said siloxane and N-vinyl pyrrolidone of said siloxane, and heating the mixture to a temperature from 30° C. to 150° C. to cause the siloxane and N-vinyl pyrrolidone to react to produce a copolymeric product.

17. A process for producing a copolymer of N-vinyl pyrrolidone and a mono-vinyl siloxane, said siloxane having the graphical formula:

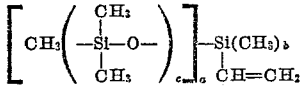

wherein $a$, $b$ and $c$ are integers, $a$ has a value from 1 to 3, $b$ has a value from 0 to 2, $c$ has a value from 1 to 6, the sum of $a$ and $b$ is 3, the product of $a$ and $c$ is from 1 to 6 and there are up to 7 silicon atoms in the molecule; which comprises forming a mixture of said siloxane, N-vinyl pyrrolidone and a vinyl-type polymerization catalyst, said mixture containing from about 1% to about 99% by weight of the total weight of said siloxane and N-vinyl pyrrolidone of said siloxane, and heating the mixture to a temperature from 80° C. to 130° C. to cause the siloxane and N-vinyl pyrrolidone to react to produce a copolymeric product.

No references cited.